United States Patent
Murayama et al.

(10) Patent No.: US 6,516,005 B1
(45) Date of Patent: Feb. 4, 2003

(54) APPARATUS AND METHOD FOR DATA DECODING

(75) Inventors: Shu Murayama, Tokyo (JP); Takeshi Mio, Tokyo (JP); Hiroshi Honma, Tokyo (JP); Susumu Oka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/224,052

(22) Filed: Dec. 31, 1998

(30) Foreign Application Priority Data

Jun. 12, 1998 (JP) .......................... 10-164642

(51) Int. Cl.$^7$ ................................. H04J 3/06
(52) U.S. Cl. .................... 370/503; 370/536; 348/423.1; 348/464; 348/512
(58) Field of Search ................. 370/503, 536; 348/423.1, 462, 464, 468, 512

(56) References Cited

U.S. PATENT DOCUMENTS

| | | | |
|---|---|---|---|
| 4,591,980 A | 5/1986 | Huberman et al. | 364/200 |
| 5,091,864 A | 2/1992 | Baji et al. | 706/42 |
| 5,151,969 A | 9/1992 | Petsche | 395/24 |
| 5,153,923 A | 10/1992 | Matsuba et al. | 382/14 |
| 5,214,715 A | 5/1993 | Carpenter et al. | 382/15 |
| 5,636,326 A | 6/1997 | Stork et al. | 395/21 |
| 5,774,632 A | 6/1998 | Kaske | 395/22 |
| 5,789,962 A | 8/1998 | Bulsara et al. | 327/355 |
| 5,889,564 A * | 3/1999 | Tsukagoshi | 348/594 |
| 6,072,832 A * | 6/2000 | Katto | 375/240 |
| 6,148,135 A * | 11/2000 | Suzuki | 386/12 |
| 6,151,441 A * | 11/2000 | Kawamura et al. | 386/95 |
| 6,356,312 B1 * | 3/2002 | Lyu | 348/512 |

FOREIGN PATENT DOCUMENTS

| | | |
|---|---|---|
| EP | 598295 A1 | 5/1994 |
| GB | 2333017 | 7/1999 |
| JP | 8-331511 | 12/1996 |
| JP | A-9-214351 | 8/1997 |
| JP | 9-219859 | 8/1997 |

OTHER PUBLICATIONS

Hanson, Cowen, Giles, "Advances in Neural Information Processing Systems 5, Deriving Receptive Fields Using an Optimal Encoding Criterion," Ralph Linsker, pp. 953–960, 1993.

Cooper, David L., "Linguistic Attractors the Cognitive Dynamics of Language Acquisition and Change," pp. 1–48 (unpublished document).

L. Zhang et al., "Generating and Coding of Fractal Graphs by Neural and Mathematical Morphology Methods," IEEE Transactions on Neural Networks, vol. 7, No. 2, pp. 400–407 3/96.

Siegel, Edward, "Bose Einstein Condensation of Light: Liquid Light Superfluidity Application to Neural–Networks Equivalence to Quantum Statistics: Automatic Optimizing Optimization–Problems Optimally (OOPO)," 1994 Lasers and Electro–Optics Society Meeting, vol. 1, pp. 153–154. 1994.

* cited by examiner

*Primary Examiner*—Alpus H. Hsu
*Assistant Examiner*—Roberta Stevens
(74) *Attorney, Agent, or Firm*—Birch, Stewart, Kolasch & Birch, LLP

(57) ABSTRACT

The object of this invention is to realize the correct and prompt synchronization of data in decoding and reproducing multiplexed coded data multiplexed with a plurality of media coded data in the unit of packet without regard to the configuration or characteristics of the apparatus. To achieve a data decoder that can synchronize the video and audio data correctly, the timing controller obtains a buffering time indicated by the time difference between the decoding end time and the specified presentation time contained in the data, and data buffering is performed by buffer memory. The video decoding end time is latched from the system time counter according to a timing pulse generated by the video decoder when the first decoded data is output from video decoder after the data decoder is activated.

15 Claims, 20 Drawing Sheets

APPARATUS AND METHOD FOR DATA DECODING

FIELD OF THE INVENTION

This invention relates to an apparatus and method for data decoding, for inputting multiplexed coded data containing two or more coded data, and synchronizing outputs of decoded data based on the time information included in the multiplexed coded data.

DESCRIPTION OF THE RELATED ART

One conventional example of a data decoder is shown in FIG. 20, which is disclosed in the Japanese Unexamined Patent Publication No. Hei 09-214351. The device is a Moving Picture Experts Group (MPEG) decoder. After a coded data having multiplexed video and audio media data is input to the decoder, a System Clock Reference (SCR) is demultiplexed at a demultiplexer 34, and then SCR is sent to a system synchronization controller 28. Media data, which is the video data and audio data, is also demultiplexed at demultiplexer 34, and stored in a buffer 22a and a buffer 22b, respectively. A video decoder 32 and an audio decoder 30 decode the coded video and audio data stored in buffers 22a and 22b, and at the same time, demultiplex a video Presentation Time Stamp (PTS) and an audio PTS which specify the presentation time, and transmit the video PTS and audio PTS to system synchronization controller 28.

System synchronization controller 28 monitors and determines the output timing of the decoded data based on the two PTS values and a System Synchronous Clock (SSC) value reproduced from the SCR. The determination result, the time difference in the decoding timing is notified to an audio decoder 30 for the audio data, and to a video decoder 32 for the video data.

System synchronization controller 28 determines the output timing by comparing the SSC value with the PTS added by the offset values. Agreed values indicate that the timing is correct. When the SSC value is larger, the decoding speed is slow, while the smaller SSC value indicates that the decoding speed is fast. The offset value is a fixed value kept by system synchronization controller 28, and can be changed with a dip switch, etc., because the offset value defers depending on the system configuration, and so on.

The offset value can be automatically adjusted in accordance with the determination result. For instance, if the audio decoding speed is determined to be fast consecutively for more than a certain number of times, then the offset value is decreased.

The conventional data decoder is inconvenient because the characteristics of a encoder changes every time when the encoder is changed, and the offset value has to be changed. When the automatic adjustment function of the offset value is used, it takes time to find the correct value.

This invention aims at solving the above-mentioned problems. It aims at realizing correct and prompt media synchronization between video and audio, and minimizing the buffering time before decoding.

SUMMARY OF THE INVENTION

A data decoder of the present invention may comprise a demultiplexer for inputting a multiplexed coded data including a first coded data and a second coded data, and a synchronous information for synchronizing the first coded data and the second coded data, and outputting the first coded data, the second coded data, and the synchronous information separately; a first buffer memory for inputting and storing the first coded data demultiplexed by the demultiplexer; a second buffer memory for inputting and storing the second coded data demultiplexed by the demultiplexer; a first decoder for inputting and decoding the first coded data stored in the first buffer memory, and outputting a decoded data as a first decoded data; a second decoder for inputting and decoding the second coded data stored in the second buffer memory, and outputting the decoded data as a second decoded data; and a timing controller for inputting the synchronous information demultiplexed by the demultiplexer, for obtaining a buffering time to store the first coded data in the first buffer memory as a first buffering time and a buffering time to store the second coded data in the second buffer memory as a second buffering time, and for controlling an output time of the first coded data stored in the first buffer memory to the first decoder based on the first buffering time and controlling an output time of the second coded data stored in the second buffer memory into the second decoder based on the second buffering time, so that the first decoded data by the first decoder and the second decoded data by the second decoder may be output synchronously as indicated by the synchronous information.

The demultiplexer may demultiplex a first specified presentation time at which the first decoded data is to be output and a second specified presentation time at which the second decoded data is to be output as the synchronous information, and the timing controller may calculate the first buffering time and the second buffering time in such a manner that a time difference between the first specified presentation time and the second specified presentation time may agree to a time difference between the output time of the first decoded data and the output time of the second decoded data.

The first decoder may output a first timing pulse when the first decoded data in a designated unit has been decoded, and the second decoder may output a second timing pulse when the second decoded data in the designated unit has been decoded, and the timing controller may input the first and the second timing pulses, obtain a first and a second presentable times, respectively, and assign the time difference between the first specified presentation time and the first presentable time as the first buffering time and the time difference between the second specified presentation time and the second presentable time as the second buffering time.

The timing controller may input the timing pulse at a time of completing a first decoding of the first decoded data in the designated unit as the first timing pulse and input the timing pulse at the time of completing the first decoding of the second decoded data in the designated unit as the second timing pulse.

The demultiplexer may demultiplex and output a first identifier for identifying the first decoded data in each designated unit, and demultiplex and output a second identifier for identifying the second decoded data in each designated unit, and the first decoder may output the first identifier and the first timing pulse and the second decoder may output the second identifier and the second timing pulse, and the timing controller may input the first identifier output from the demultiplexer and the first identifier output from the first decoder, may identify the first decoded data, and calculate the first buffering time of the first decoded data to be decoded after an identified first decoded data, and input the second identifier output from the demultiplexer and the second identifier output from the second decoder, identify the second decoded data, and calculate the second buffering time of the second decoded data to be decoded after an identified second decoded data.

The first and second identifiers may be numeric values assigned to the first and second coded data for each designated unit at the time of coding.

The first and second identifiers may be numeric values assigned to the first and second coded data by the demultiplexer for each designated unit.

The timing controller may obtain a presentable time for the first decoded data using a remaining buffer amount management information contained in the first decoded data, and assign the time difference between the first specified presentation time and a first presentable time as the first buffering time.

The timing controller may add a buffering time of the first decoded data indicated as the remaining buffer amount management information at the time when the demultiplexer may demultiplex the first decoded data and a delay time required by the first decoder for a decoding processing of the first decoded data, in order to obtain the presentable time.

The timing controller may subtract a same designated time from the first buffering time and the second buffering time to obtain a new first buffering time and a new second buffering time.

The same designated time may be a time shorter of the first buffering time and the second buffering time.

The first decoder and the second decoder may have frame buffers which store the first and second decoded data in designated units respectively, and then output at a designated timing, and may output a first and a second timing pulses when the first and second decoded data are output from the frame buffers in the designated units respectively, and the timing controller may input the first and the second timing pulses, obtain a first and a second presentable times, and assign the time difference between the first specified presentation time and the first presentable time as a first buffering time, and the time difference between the second specified presentation time and the second presentable time as a second buffering time.

A data decoding method of the present invention may comprise the steps of: inputting a multiplexed coded data including a first coded data and a second coded data and a synchronous information for synchronizing the first coded data and the second coded data and separately outputting the first coded data, the second coded data, and the synchronous information; inputting the first coded data demultiplexed at a demultiplexing step and storing in a first buffer memory; inputting the second coded data demultiplexed at the demultiplexing step and storing in a second buffer memory; inputting and decoding the first coded data stored in the first buffer memory, and outputting a decoded data as a first decoded data; inputting and decoding the second coded data stored in the second buffer memory, and outputting the decoded data as a second decoded data; and inputting the synchronous information demultiplexed by the demultiplexing step, obtaining a buffering time to store the first coded data in the first buffer memory as a first buffering time and a buffering time to store the second coded data in the second buffer memory as a second buffering time, and for controlling an output time of the first coded data stored in the first buffer memory to the first coded data decoding step based on the first buffering time and the second coded data stored in the second buffer memory into the second coded data decoding step based on the second buffering time, so that the first decoded data by the first decoder and the second decoded data by the second decoder are output synchronously as indicated by the synchronous information.

BRIEF EXPLANATION OF THE DRAWINGS

Other object features, and advantages of the invention will be apparent from the following description when taken in conjunction with the accompanying drawings.

In the figures.

PREFERRED EMBODIMENTS OF THE INVENTION

Embodiment 1

Figure 1:
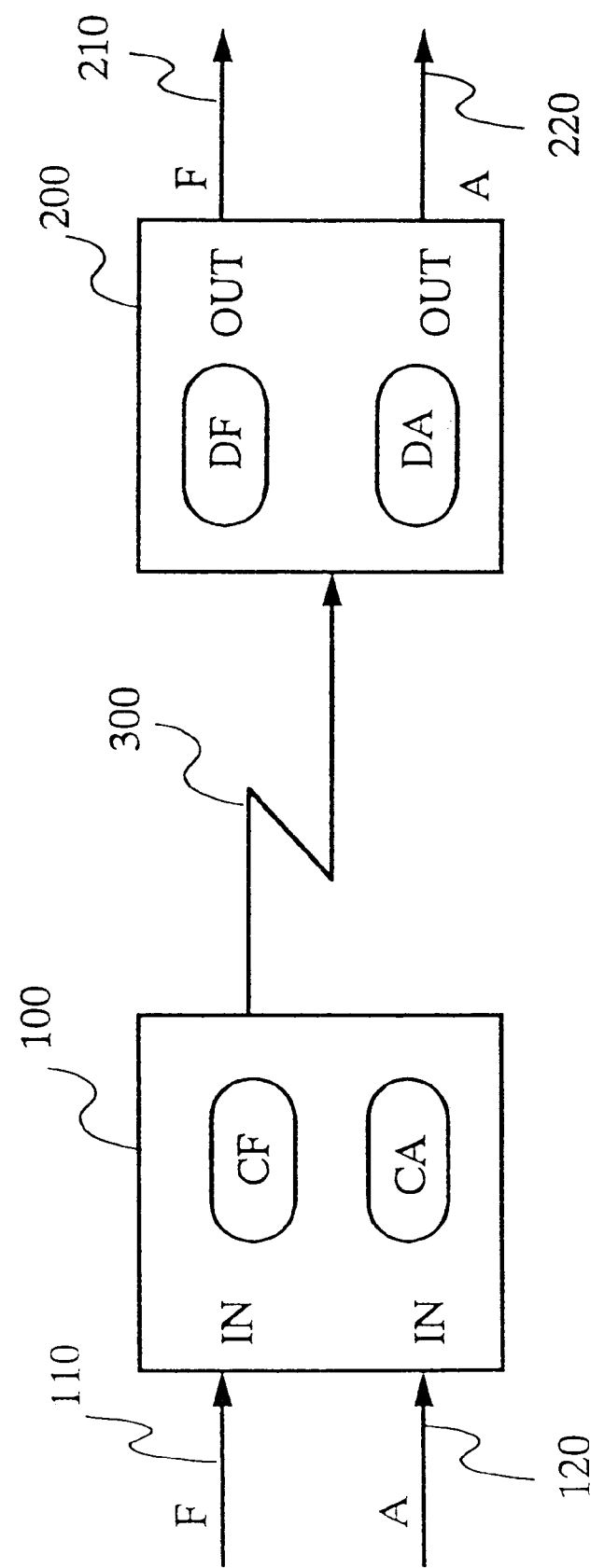
FIG. 1 is a system configuration showing a data encoder 100 and a data decoder 200.

FIG. 1 is a system configuration showing a data encoder 100 and a data decoder 200.

Data encoder 100 inputs a first data which is a video data 110 and a second data, an audio data 120. Data encoder 100 encodes video data 110 and audio data 120 and generates a first coded data and a second coded data. Furthermore, data encoder 100 multiplexes the first coded data and the second coded data, and outputs a multiplexed coded data 300. Multiplexed coded data 300 is input to data decoder 200. Data decoder 200 demultiplexes multiplexed coded data 300 into the first coded data and the second coded data. The first coded data is decoded and output as the first decoded data, which is a video data 210. The second coded data is also decoded, and output as the second decoded data, which is an audio data 220.

Video data 110 is input to data encoder 100 as a sequence of a video frame F. The time necessary for coding the video frame F is assumed as a coding time CF for the video data.

Also, audio data 120 is input as a sequence of an audio frame A. The time necessary for coding the audio frame A is assumed as a coding time CA for the audio data. Also, the time for decoding the video data of data decoder 200 is assumed as a decoding time DF for the video data. And, the time for decoding the audio data of data decoder 200 is assumed as a decoding time DA for the audio data.

Figure 2:
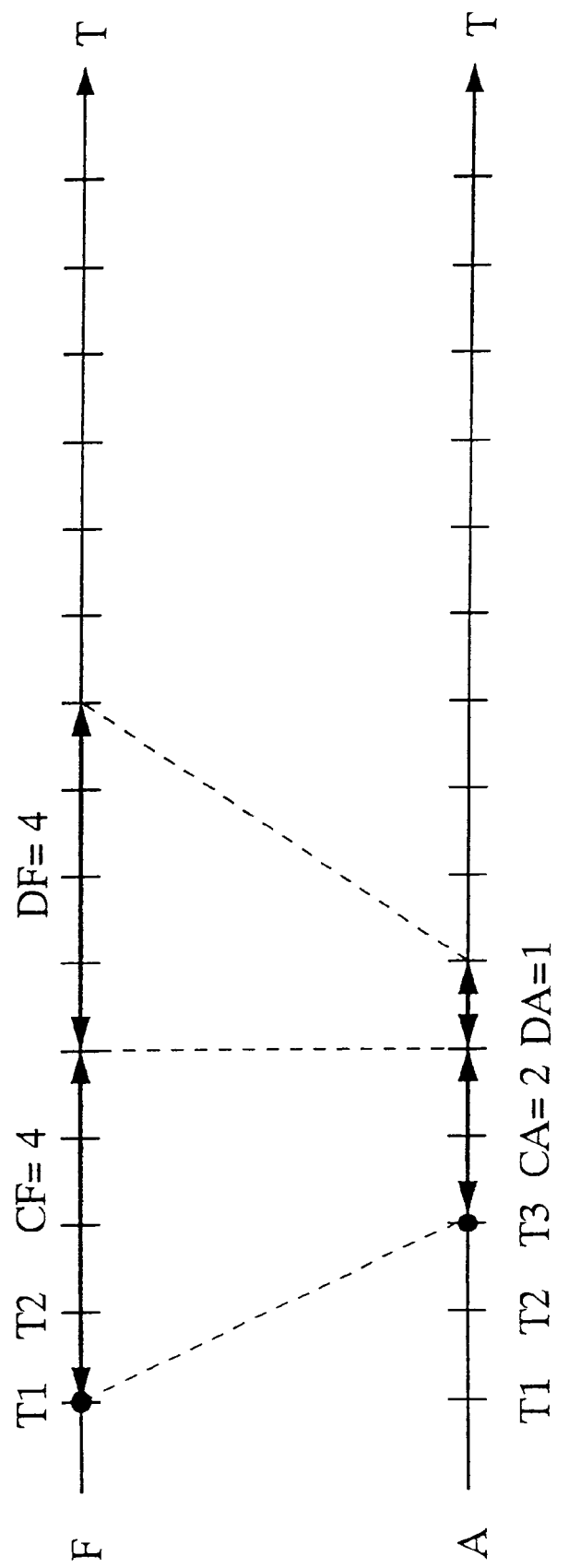
FIG. 2 shows the coding processing time and decoding processing time;.
Figure 3:
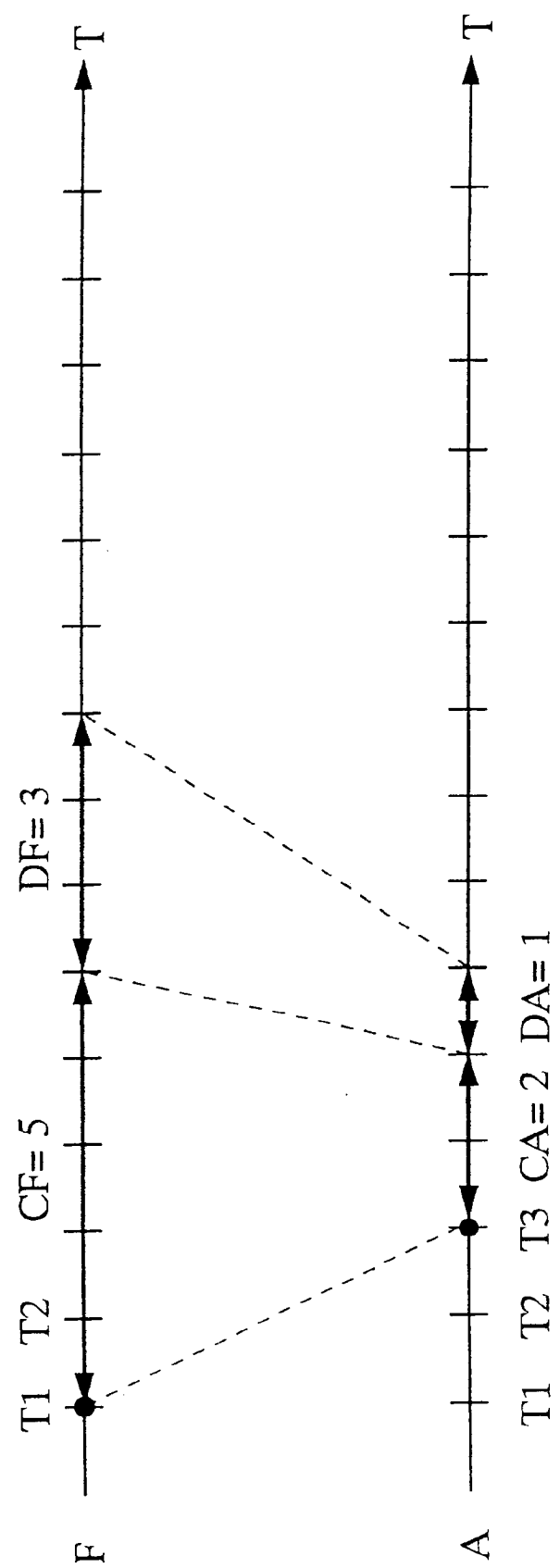
FIG. 3 shows the coding processing time and decoding processing time.
Figure 4:
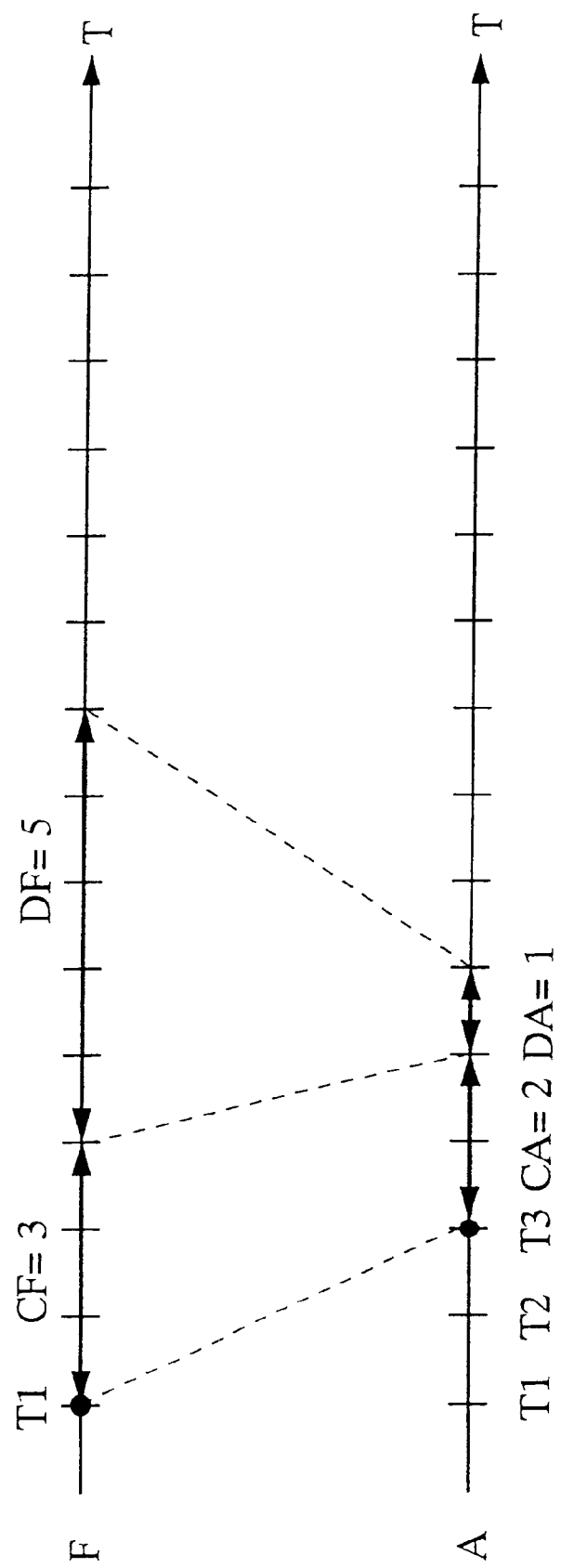
FIG. 4 shows the coding processing time and decoding processing time.

FIGS. 2,3, and 4 show the relationship between the coding time and the decoding time with horizontal lines indicating time T.

FIGS. 2,3, and 4 show a case where the video frame F is input at a time T1 and the audio frame A is input at a time T3. As shown in FIGS. 2,3, and 4, the coding time CF for the video data varies by each video frame, and the decoding time DF for the video data also indicates different cases. However, the sum between the coding time CF for the video data and the decoding time DF for the video data is equal. For the video frame F, the coding time CF for the video data and the decoding time DF for the video data change frame by frame depending on its composition. However, the coding and decoding are carried out in such a manner that the sum between the coding time CF for the video data and the decoding time DF for the video data becomes constant.

On the other hand, the coding time CA for the audio data and the decoding time DA for the audio data of the audio frame A is the same for all frames.

As described above, there is a certain relationship between the coding time CF for the video data and the decoding time DF for the video data, and between the coding time CA for the audio data and the decoding time DA for the audio data.

Figure 5:
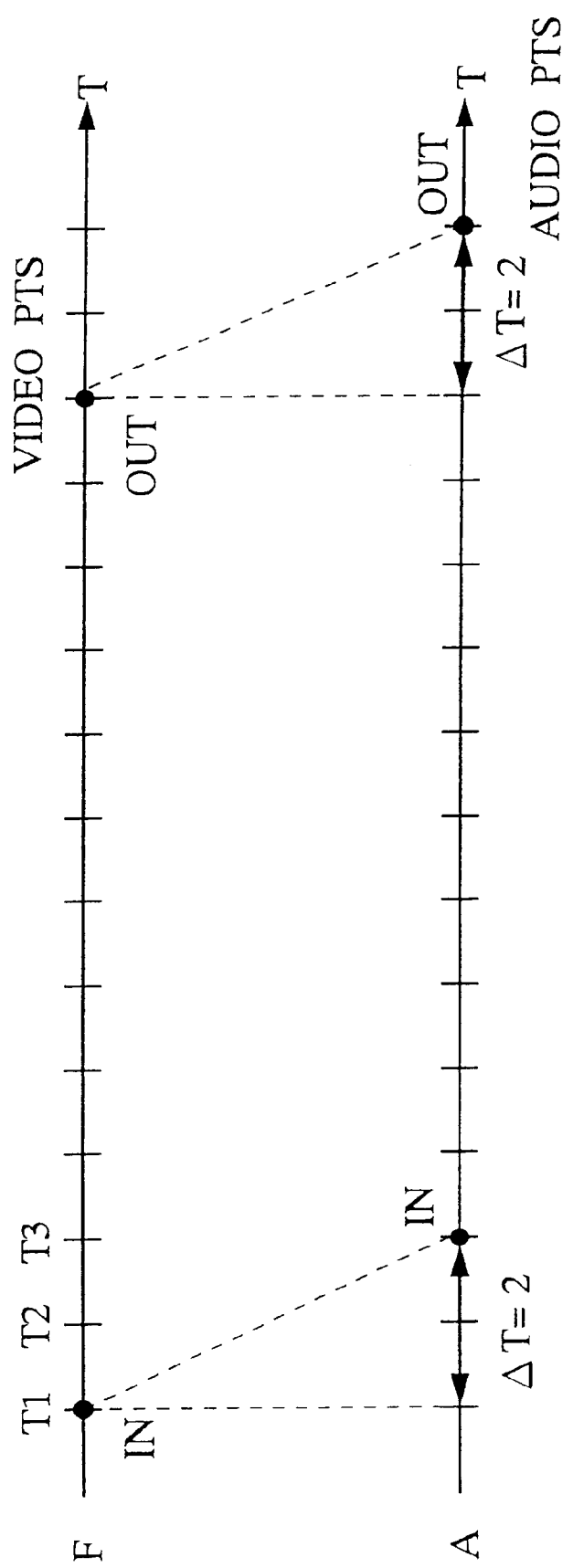
FIG. 5 shows the input time and output time of a video frame F and an audio frame A.

FIG. 5 shows the relationship between the video PTS and audio PTS.

When the video frame F is input at the time T1 and the audio frame A is input at the time T3, the difference would be T3−T1=ΔT. Data encoder 100 uses the time T1 as the video PTS in coding the video frame F. Data encoder 100 also uses the time T3 as the audio PTS in coding the audio frame A. Data decoder 200 synchronizes the video frame F and audio frame A decoded by using the video PTS and audio PTS, and outputs. The video frame F and audio frame A must be output by waiting for the time difference ΔT, and the information is detected by the video PTS value (time T1) and audio PTS value (time T3). That is, data decoder 200 can output the video frame F and audio frame A at the timing the same as the timing for the video frame F and the audio frame A input to data encoder 100.

This embodiment attempts to offer a data decoder which is capable of outputting the video frame F and audio frame A correctly by synchronizing with the video PTS and audio PTS shown in FIG. 5, when the characteristics shown in FIGS. 2,3, and 4 are featured.

Figure 6:
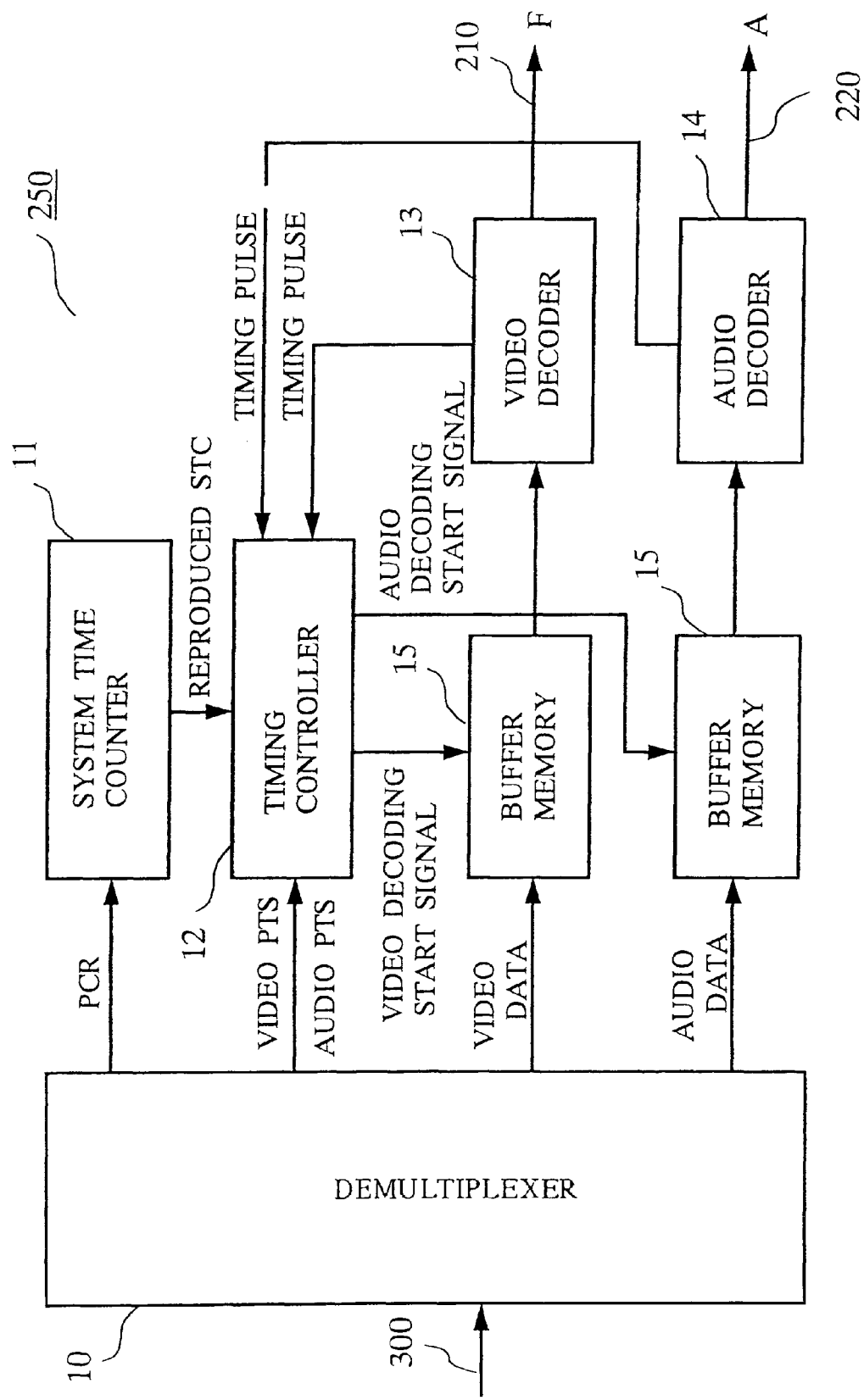
FIG. 6 shows a configuration of a data decoder 250 of Embodiment 1.

FIG. 6 shows the entire configuration of data decoder 250 of this embodiment.

An example of multiplexing the video data and audio data as multiplexed coded data 300 in which various types of media data are multiplexed is explained. It is also possible to use other data, such as data transmitted over data broadcasting, etc. Or, two or more types of multiplexed data can also be applied.

FIG. 6 shows that two or more types of media coded data are multiplexed in a unit of packet. It also shows data decoder 250 which inputs multiplexed coded data 300 including a reference clock reproduction time information (PCR, which will be explained later on) and a specified presentation time (the video PTS and audio PTS which will be described later on) as the time information to take synchronization among various types of media, and decodes the data.

A packet is a transmission unit having a plurality of frames. For instance, a packet has a plurality of video frames. Or, a packet has a plurality of audio frames.

A demultiplexer 10 demultiplexes the multiplexed coded data based on their types, and the time information multiplexed into multiplexed coded data. A plurality of buffer memories 15 buffer the demultiplexed coded data according to their types. A video decoder 13 and an audio decoder 14 decode the coded data output from the buffers.

A system time counter counts standard clock (STC) reproduced by a standard clock reproduction time information (PCR), which is one of the time informations demultiplexed by the demultiplexer.

A timing controller 12 compares the specified presentation time (video PTS and audio PTS) among the time informations demultiplexed at the demultiplexer with the generated standard clock (STC) which is a count value of the counter, and then increases or decreases the buffering time so that the multimedia is output in synchronization.

Multiplexed coded data 300 is input into demultiplexer 10. Demultiplexer 10 demultiplxes the video data, audio data, video PTS, audio PTS, and the PCR (Program Clock Reference). The video data and audio data demultiplexed from multiplexed coded data 300 are stored in buffer memories 15. Then, the video PTS and audio PTS demultiplexed from multiplexed coded data 300 are sent to timing controller 12. The video PTS and audio PTS specify the presentation time of the corresponding video data and audio data. Similarly, the PCR demultiplexed from multiplexed coded data 300 is sent to system time counter 11, where, the time axis of system time counter 11 is matched to the time axis of data encoder 100. System time counter 11 sends the reproduced STC (System Time Clock) value which is the count value of the standard clock to timing controller 12 at a designated timing (T1, T2, T3, . . . ) indicated in FIG. 5. The video data and audio data of buffer memories 15 are input into video decoder 13 and audio decoder 14, respectively, by the video decoding start signal and the audio decoding start signal from timing controller 12, and then decoded and output. Video decoder 13 and audio decoder 14 output a timing pulse to timing controller 12 upon completion of decoding of the first video frame F and the first audio frame A.

Timing controller 12 measures the presentable STC values, which are the times at which the decoding finishes for video decoder 13 and audio decoder 14, using the timing pulse input from video decoder 13 and audio decoder 14. Furthermore, timing controller 12 calculates the buffering time, as explained later, based on the video PTS and audio PTS input from demultiplexer 10 and the reproduced STC value input from system time counter 11 and the presentable STC values. When the calculated buffering time has passed, timing controller 12 outputs the video decoding start signal and audio decoding start signal to buffer memories 15. Timing controller 12 controls the decoding timing of the video data and audio data based on the video decoding start signal and audio decoding start signal, and realizes the correct synchronous reproduction for both data.

Figure 7:
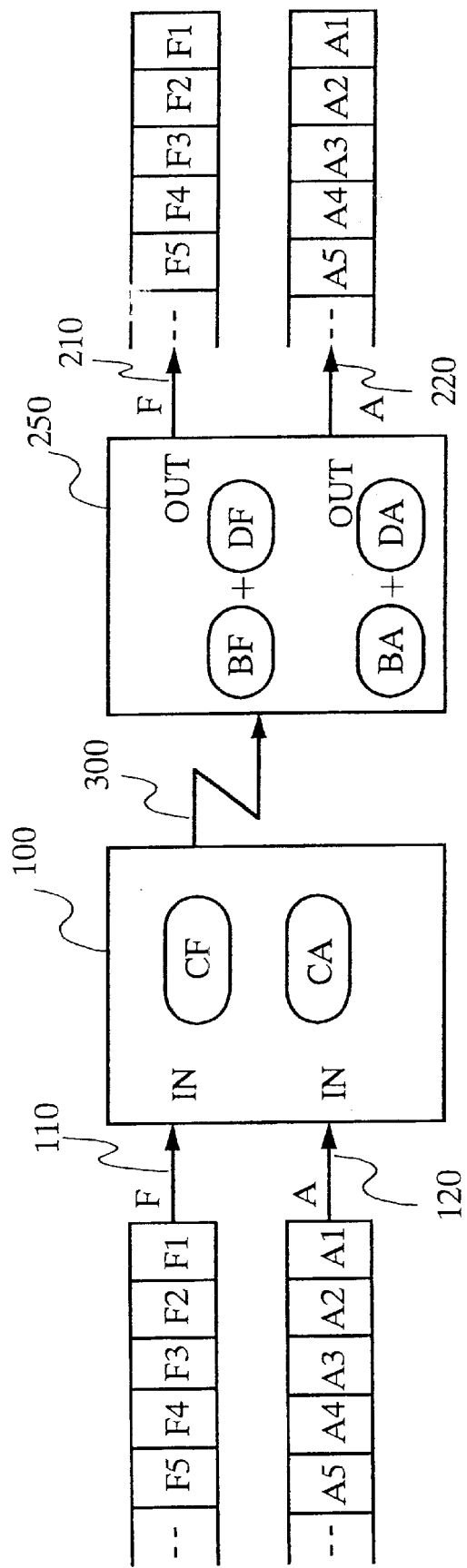
FIG. 7 shows a system configuration of data encoder 100 and data decoder 250 of Embodiment 1.

FIG. 7 is a system configuration showing data encoder 100 and data decoder 250.

FIG. 7 shows a case where data encoder 100 sequentially inputs the video frame F1 through video frame F5. It also shows a case of sequentially inputting the audio frame A1 through audio frame A5. As previously explained, data decoder 250 is equipped with buffer memories 15, and the buffering time BF for the video data and the buffering time BA for the audio data are the newly added features compared with the case shown in FIG. 1

Figure 8:
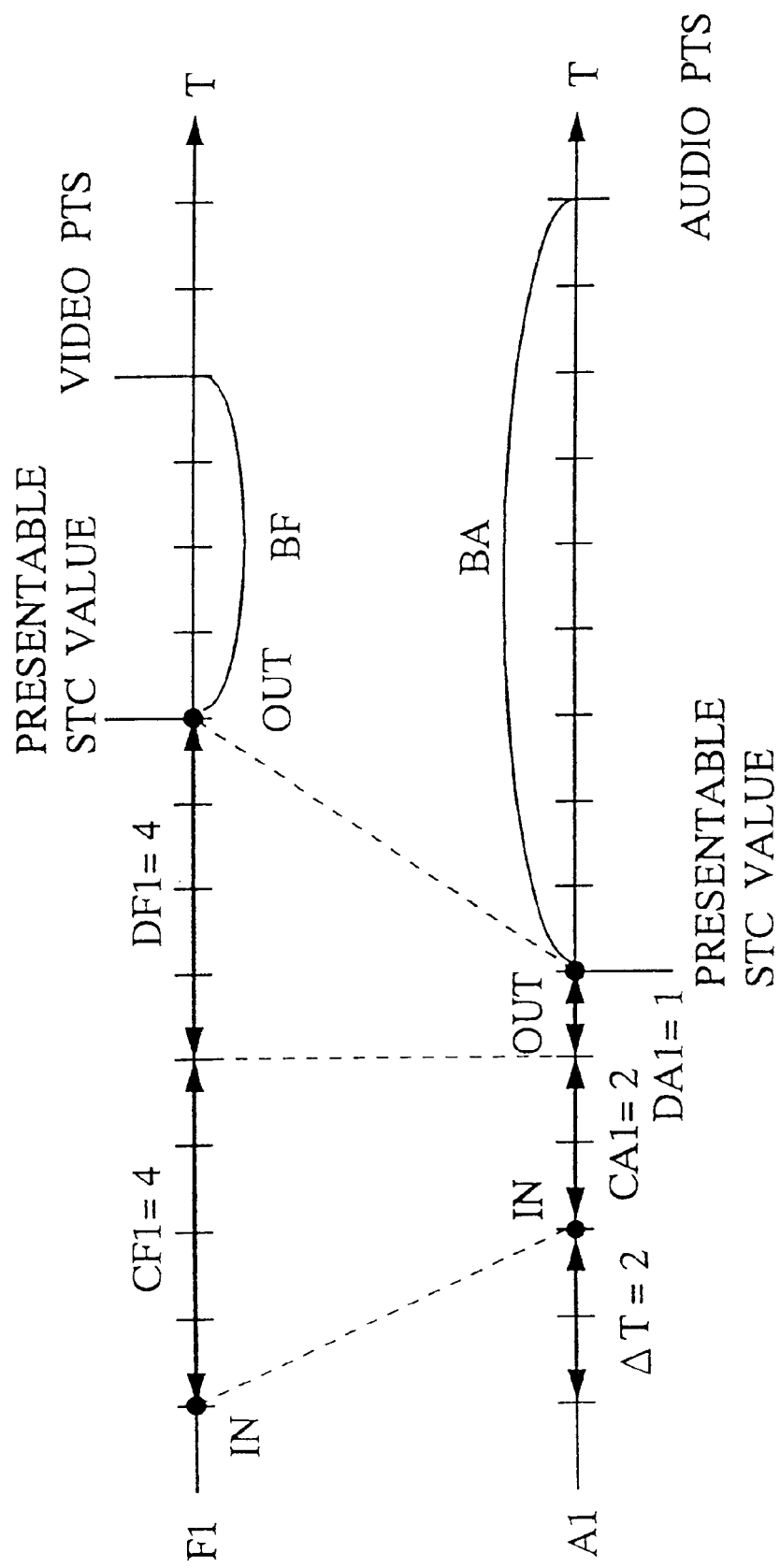
FIG. 8 shows the time passage from the time a first video frame F1 and a first audio frame A1 are input.

FIG. 8 shows the timing chart from the time the video frame F1 and audio frame A1 are input into data encoder 100 untill they are output from data decoder 250.

Figure 9:
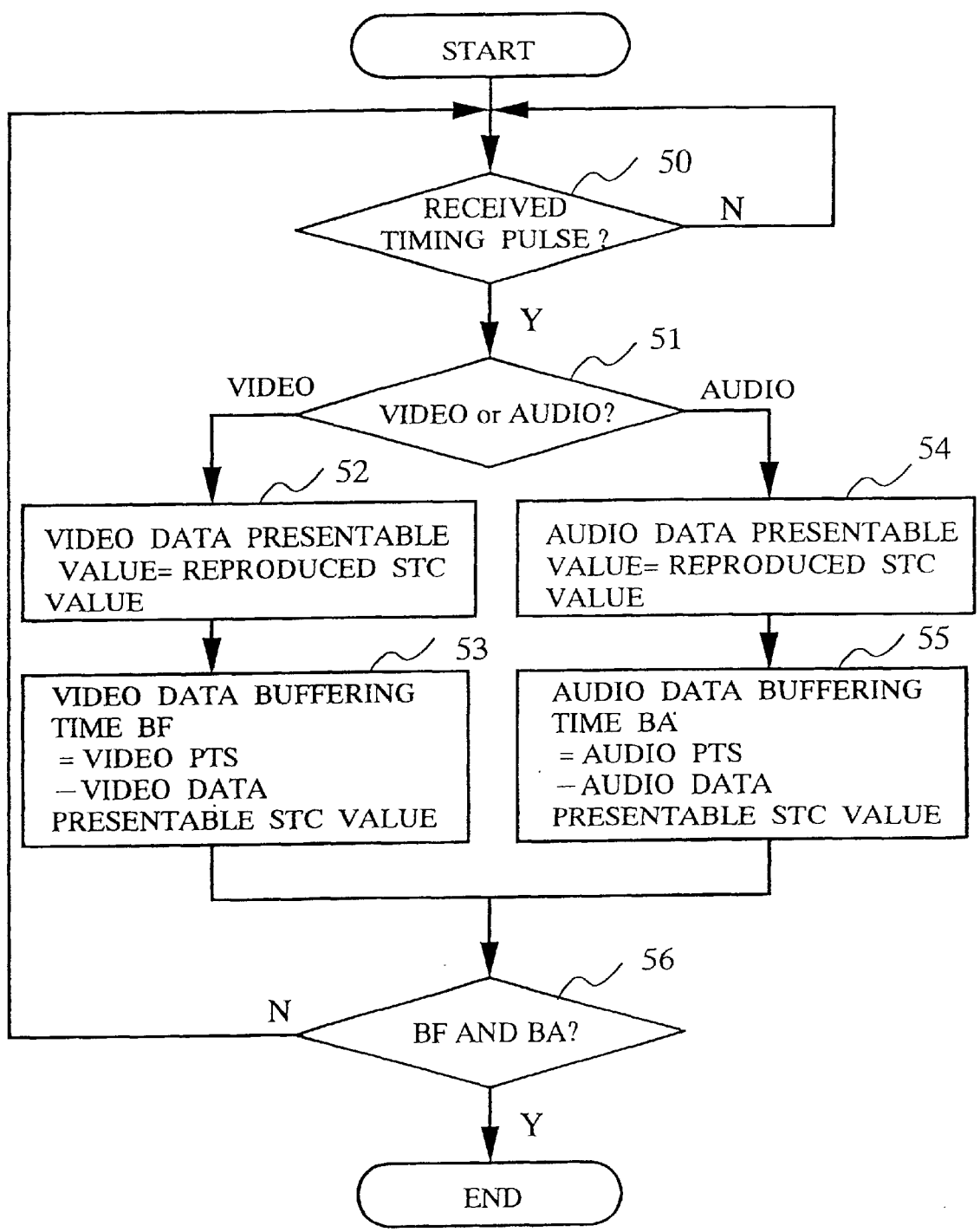
FIG. 9 is an operation flowchart of a timing controller 12.

FIG. 9 shows an operational flowchart indicating how timing controller 12 obtains the buffering time BF of the video data and the buffering time BA of the audio data.

The timing pulses are sent to timing controller 12, after the first video data and the first audio data immediately after data decoder 250 is activated (e.g., video frame F1 and audio frame A1) are decoded. Timing controller 12 keeps waiting for the reception of timing pulses from video decoder 13 or audio decoder 14 (step 50). Upon receiving a timing pulse, timing controller 12 determines whether it is sent from video decoder 13 or audio decoder 14 (step 51). When the timing pulse is from video decoder 13, a reproduced STC is latched from system time counter 11 according to the timing pulse. The reproduced STC value latched by the timing pulse is assigned as a presentable STC value of the video data (step 52). Because the video PTS input to timing controller 12 firstly is the video PTS of the first video frame F1, the presentable STC value of the video PTS becomes the buffering time BF of the video data (step 53). The buffering time (BA) is calculated for the audio data in a similar way (steps 54, 55). When both of the buffering time BF for the video data and the buffering time BA for the audio data are obtained, the operation for obtaining the buffering time completes (step 56).

The difference between the time indicated by the presentable STC value and the time indicated by the PTS becomes the buffering time for the video data and audio data, respectively, that is, the buffering time BF for the video data and the buffering time BA for the audio data.

Figure 10:
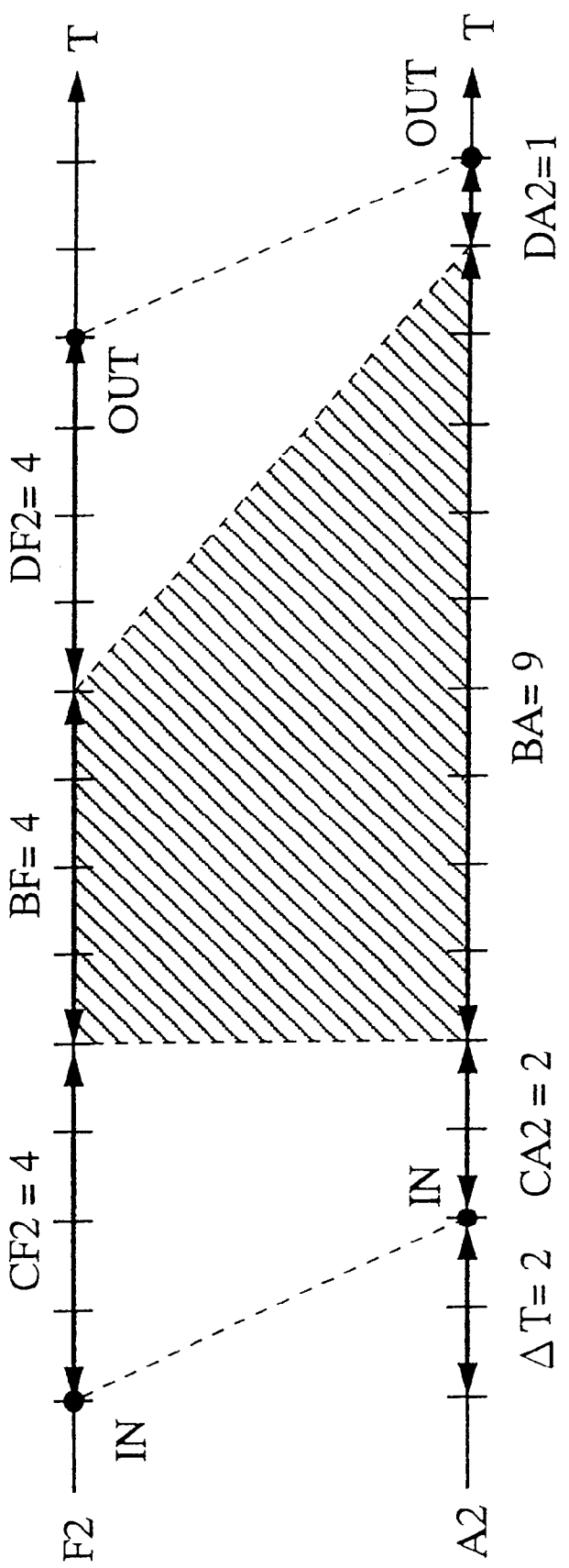
FIG. 10 shows the time passage from the input time to the output time of a video frame F2 and an audio frame A2.
Figure 11:
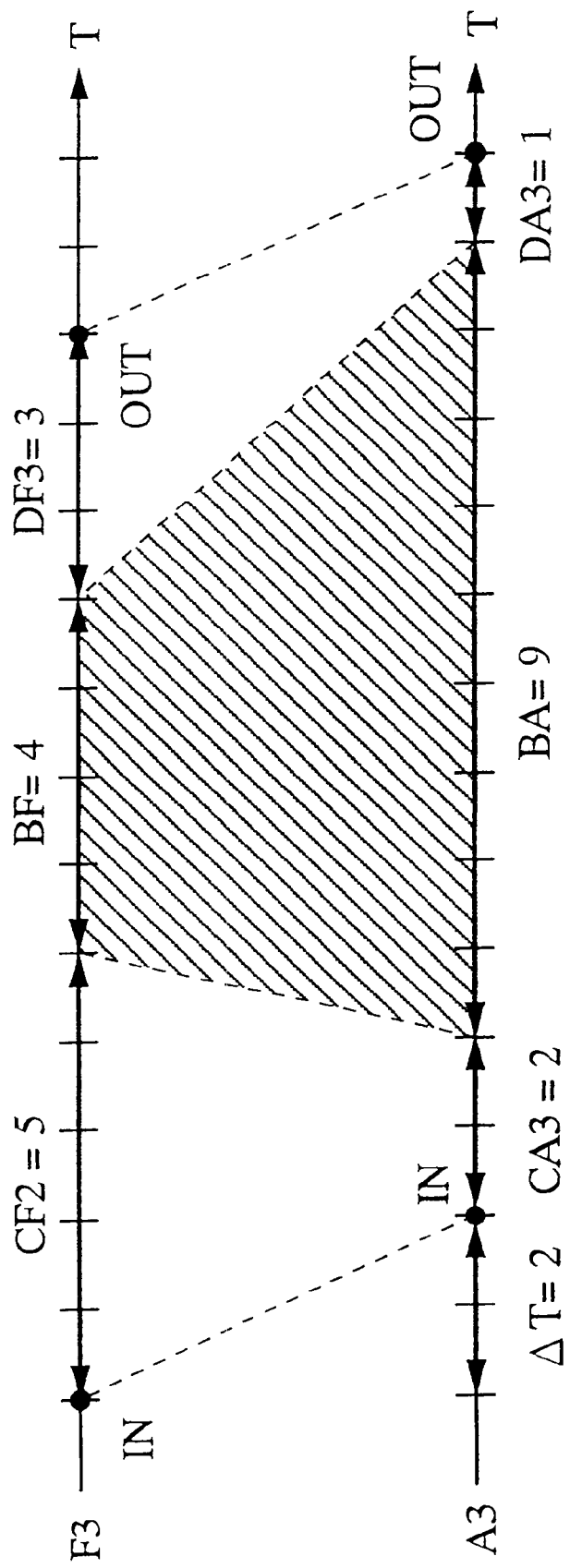
FIG. 11 shows the time passage from the input time to the output time of a video frame F3 and an audio frame A3.
Figure 12:
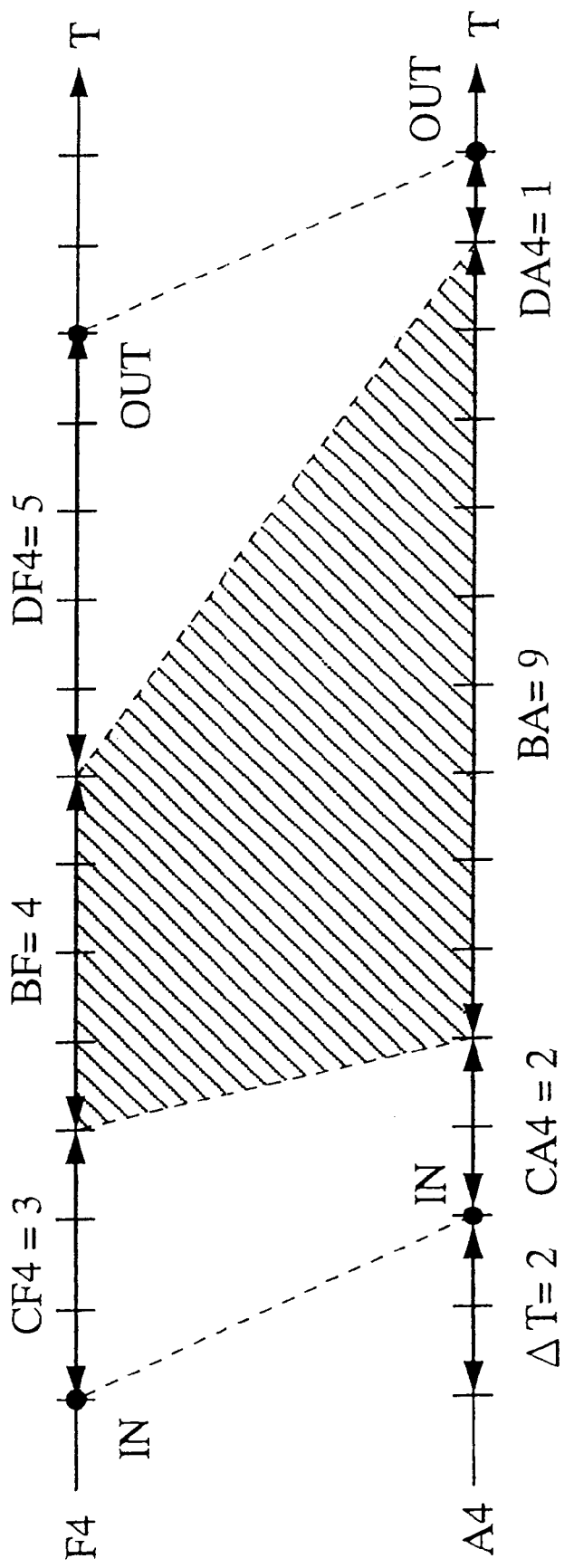
FIG. 12 shows the time passage from the input time to the output time of a video frame F4 and an audio frame A4.
Figure 13:
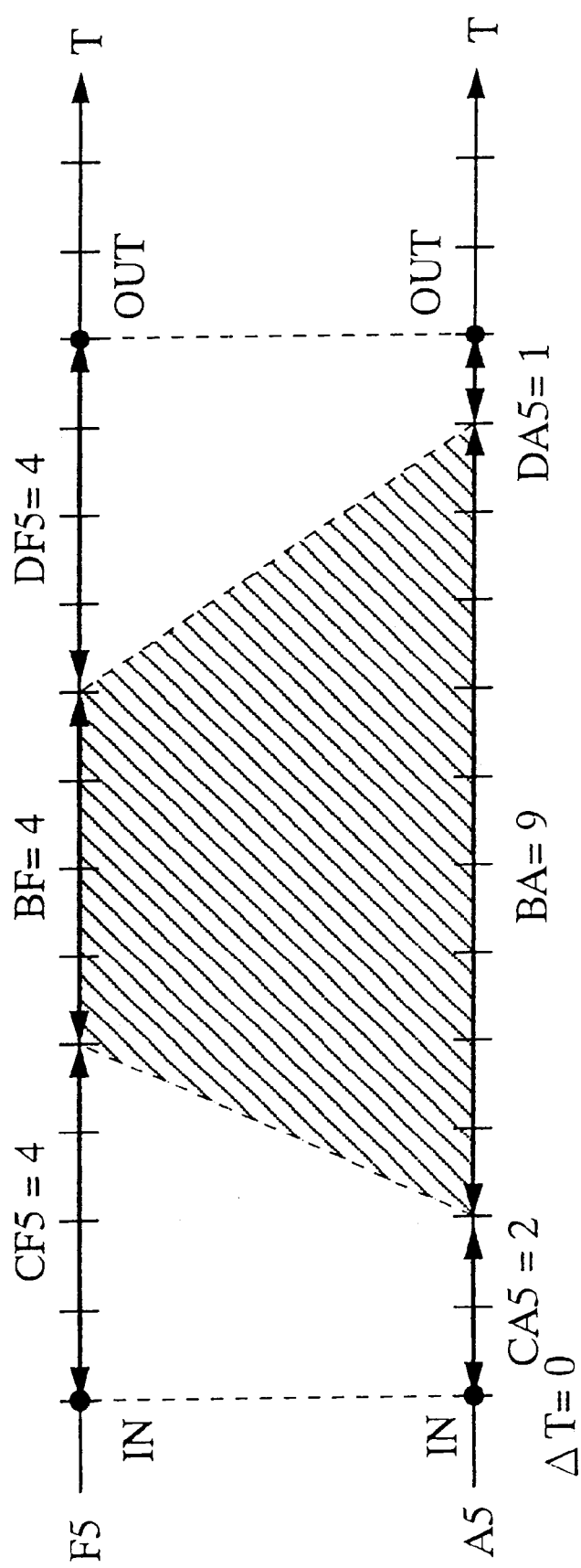
FIG. 13 shows the time passage from the input time to the output time of a video frame F5 and an audio frame A5.

FIG. 10, FIG. 11, FIG. 12. and FIG. 13 are the timing charts showing how the video frames F2 to F5 and the audio frames A2 to A5 are decoded using the buffering time BF for the video data and the buffering time BA for the audio data obtained as explained above.

After the buffering time BF for the video data has passed since the time the coded data is demultiplexed at demultiplexer 10, timing controller 12 sends the video decoding start signal to buffer memory 15 for the video data. Based on the buffering time BA for the audio data calculated in the same manner, the audio decoding start signal is also sent from timing controller 12, and the video data and audio data are decoded and output in perfectly synchronous state. As shown in FIG. 10 to FIG. 13, the video data and audio data decoded by the time difference equivalent to the time difference ΔT at the time of input are output.

As previously explained, the decoding processing of the video data is a variable time processing while the decoding of the audio data or character data is a fixed time processing. Concerning the data whose signals are processed at fixed timing, it is possible that the reproduced STC value is not latched by the timing pulse from audio decoder 14, but the reproduced STC value is latched from system counter 11 by the demultiplexing timing at demultiplexer 10. In this case, the presentable STC value can be calculated by adding the audio decoding processing delay time which is the fixed value to the latched reproduced STC, thus processing can be simplified.

Embodiment 2

Figure 14:
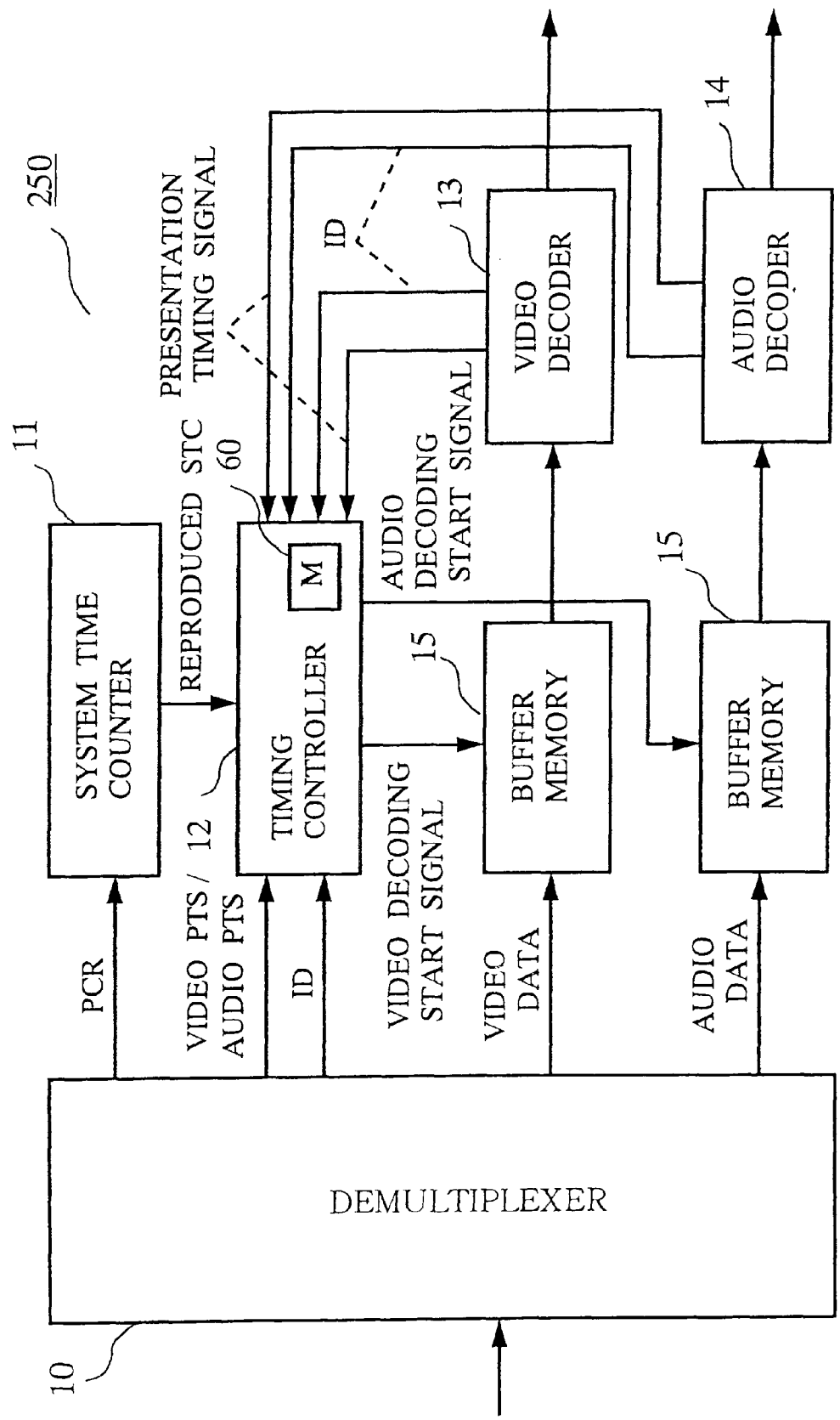
FIG. 14 is a configuration of a data decoder 250 of Embodiment 2.

Although the timing pulse from the decoder is used for calculating the presentable STC value by timing controller 12 in Embodiment 1, if the time to be buffered has changed for some reason, the apparatus must be reactivated in this method because the buffering time is calculated only once immediately after the activation. Therefore, a configuration which enables the measurement of presentable STC value at any given time is shown in FIG. 14.

When the video PTS is demultiplexed from the video coded data by demultiplexer 10, an identifier (ID) for identifying the coded data from which the video PTS has been demultiplexed is also sent to timing controller 12. For the decoded data in the MPEG-2 video format, the identifier is, for instance, a temporal_reference. The temporal_reference indicates the numbers from 1 to 1024 assigned to each frame of data in the packet cyclically in the order. Because there is data whose transmission order is different from its presentation order for the MPEG-2 video, the counter value indicating the presentation order called the temporal_reference is included in the data. In this Embodiment 2, the temporal_reference is used as the identifier. Timing controller 12 retains the video PTS and the identifier together in an internal memory 60

Video decoder 13 passes the timing pulse and the video data identifier (ID) to timing controller 12 after decoding. Timing controller 12 assigns the reproduced STC value latched from the presentation timing signal as the presentable STC value, and obtains the video PTS corresponding to the identifier from internal memory 60, and calculates the difference to get the buffering time.

The above-mentioned processing can be performed for every frame so that the buffering time for the next frame can be updated every time. Or, it is also possible to re-calculate the buffering time by a certain time period, for instance, 5 seconds or 10 seconds.

Embodiment 3

In Embodiment 2, demultiplexer 10 sets the temporal_reference included in the coded data as an identifier. If there is no available ID in the coded data, demultiplexer 10 may set and use a count value or numeric, or serial number, etc., counted up for each processing unit of coded data independently as an identifier.

Embodiment 4

Figure 15:
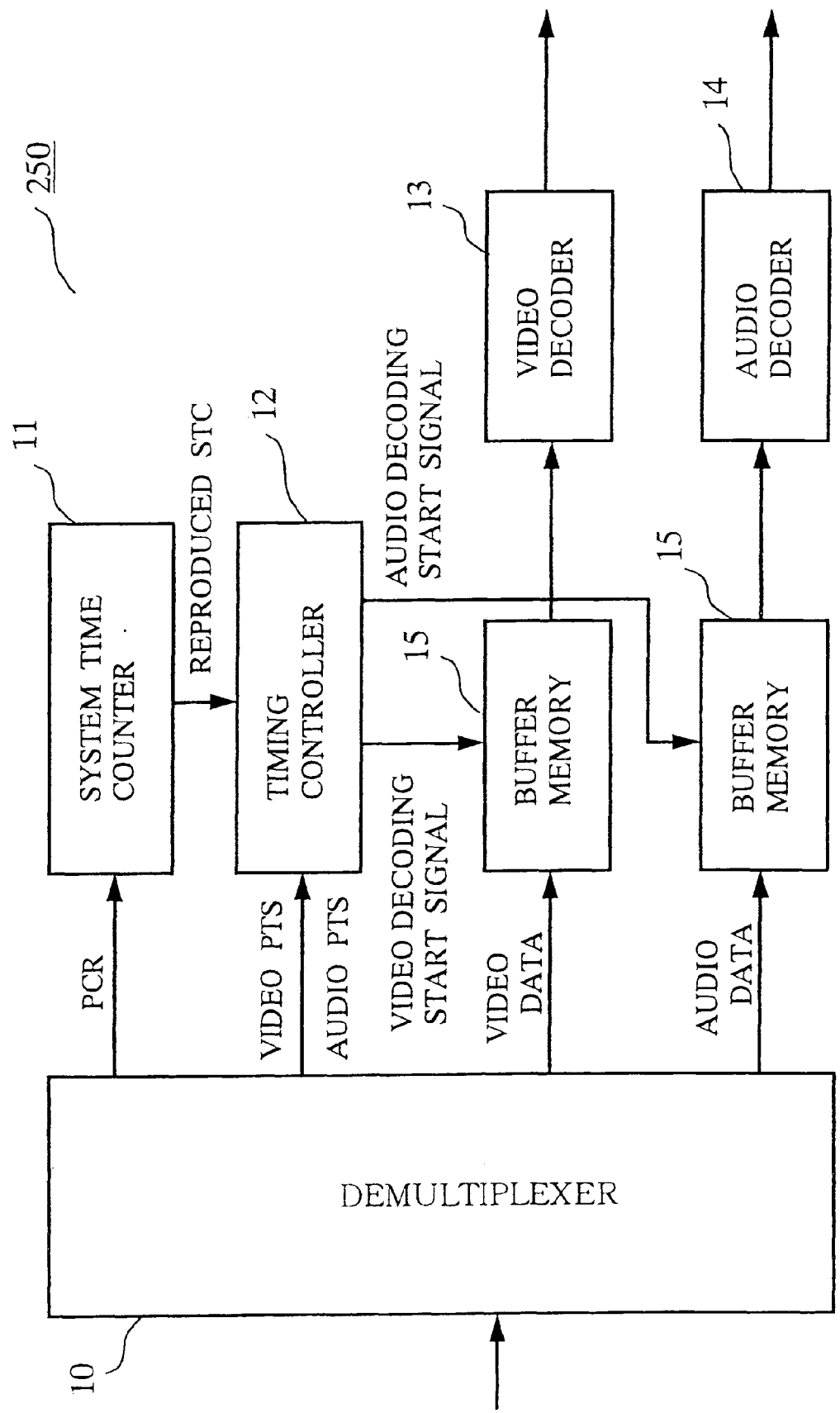
FIG. 15 is a configuration of a data decoder 250 of Embodiment 4.

For Embodiments 1 to 3, the timing pulse from the decoder is used for measuring the presentable STC value by timing controller 12. For MPEG-2 video, for instance, the presentable STC value can be calculated by using VBV (Video buffering Verifier)_delay value, which is one of the internal parameters of the coded data. As shown in FIG. 15, because the VBV_delay value exists in the coded data, timing controller 12 of this embodiment inputs only the video PTS and audio PTS from demultiplexer 10, and the timing pulses or IDs from video decoder 13 and audio decoder 14 are not required to be input.

Figure 16:
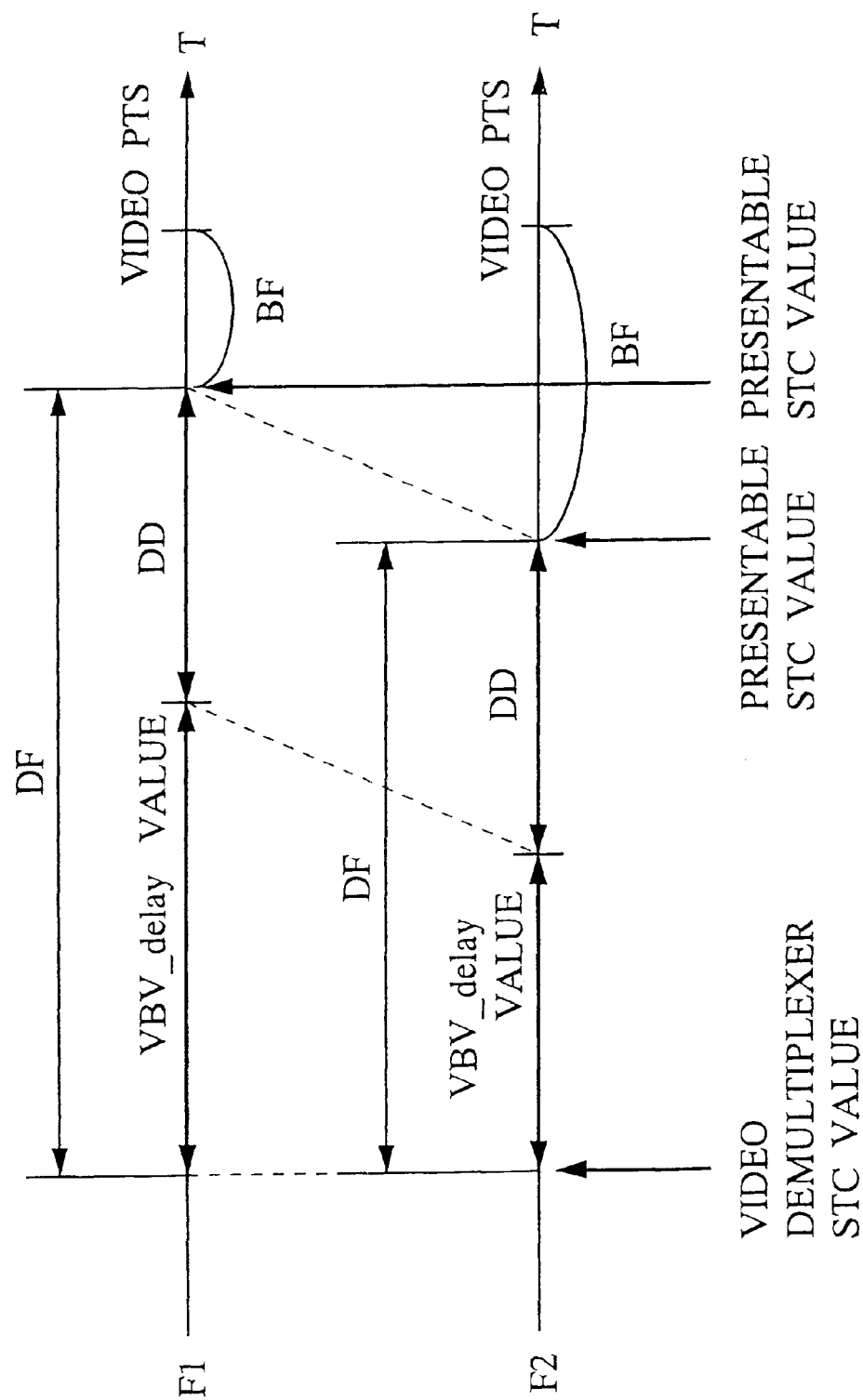
FIG. 16 explains a presentable STC value of Embodiment 4.

The VBV_delay value is the information for managing the remaining buffer amount, and used for the reading timing to avoid overflow or underflow of receiving buffer (not shown) in video decoder 13. As shown in FIG. 16, data decoder 250 stores the video data before decoding in the receiving buffer (not shown) as long as the time indicated as the VBV_delay value, and then starts decoding. The VBV_delay value is variable, however, the time from decoding start to video presentation is fixed, and this fixed value is set as the video decoding processing delay time DD.

When demultiplexer 10 latches the reproduced STC value at the timing of demultiplexing the coded video data, and sets the latched reproduced STC value as the video demultiplexing STC value, the presentable STC value of the video data can be obtained from the following formula:

Presentable STC value=video demultiplexing STC value+VBV_ delay value+video decoding processing delay time By taking the difference between the presentable STC value and video PTS, the buffering time BF of the video data can be calculated.

For the format other than the MPEG-2 video, if a parameter by which the total processing time for decoding can be calculated by adding a fixed value is contained in the decoded data, that parameter can be used.

Embodiment 5

This Embodiment sets forth the adjustment by firstly comparing the calculated buffering time BF of the video data with the buffering time BA of the audio data, and then reducing the smaller value from the buffering time of each medium in order to minimize the buffering time.

Figure 17:
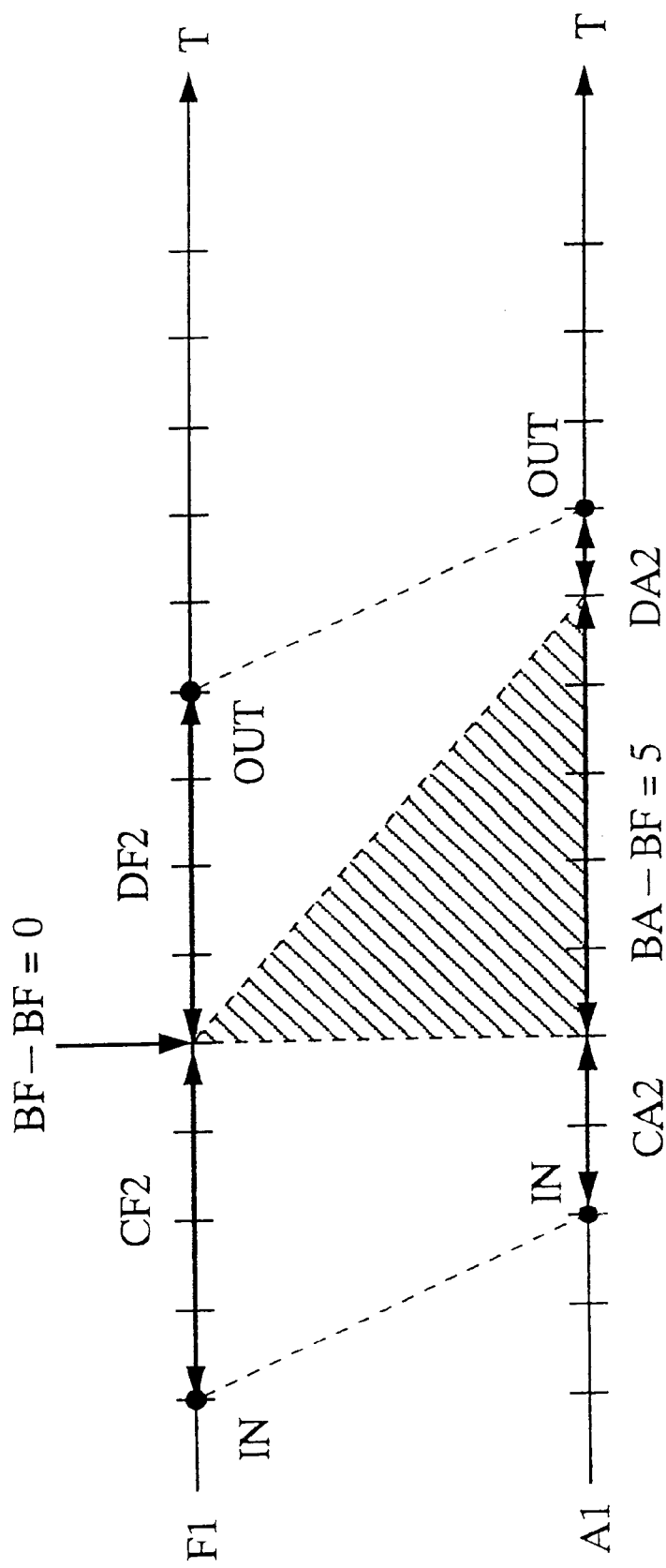
FIG. 17 explains a buffering time adjustment of Embodiment 5.

FIG. 17 shows the shortest buffering time of this Embodiment. Compared with FIG. 10, the buffering time BF of the video data is selected as the shorter of the video and audio buffering times, and then subtracted from the video and audio buffering time, respectively (BF−BF=0, BA−BF=5). When there are three or more types of data, the shortest time is selected, and subtracted from the buffering time of each data.

Figure 18:
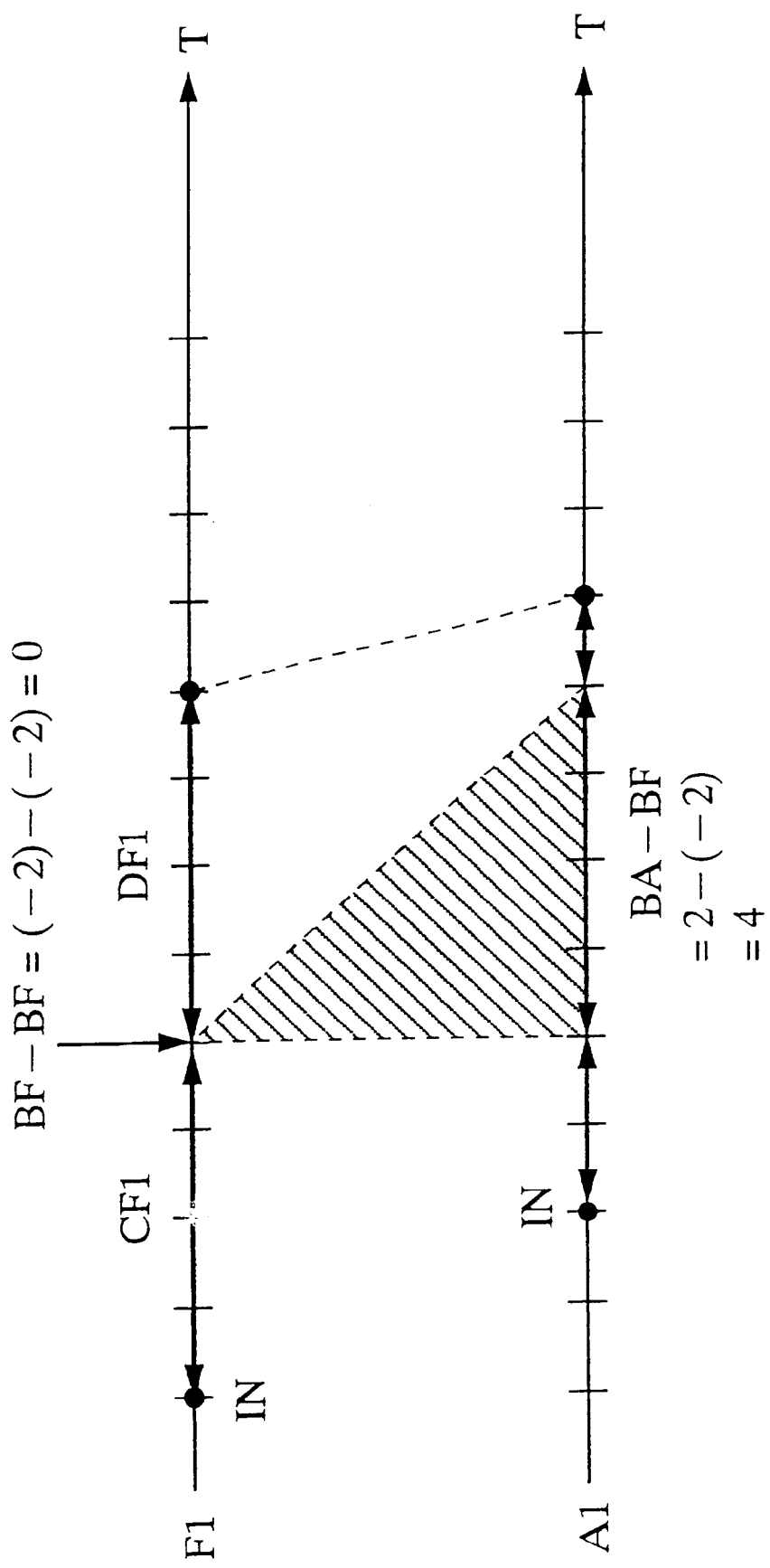
FIG. 18 explains the buffering time adjustment of Embodiment 5.

When either of the calculated buffering time is a negative value, and the negative value is the shortest value, the negative value can be subtracted as shown in FIG. 18, and the video and audio buffering time can be extended and decoded, and output in perfect synchronization between the media can be achieved.

For the case shown in FIG. 17, the shorter of the buffering times is used for subtraction. It is also possible to subtract a certain time period instead of the shorter of the buffering times.

This embodiment allows the minimizing of the buffering time. Or, it is possible to shorten the buffering time. Moreover, though the difference between the presentable time and specified presentation time is calculated regardless of its positive or negative value, decoding process itself is not affected by the calculated presentable time and specified presentation time no matter which is earlier or later.

Embodiment 6

In Embodiment 6, video decoder 13 and audio decoder 14 have a frame buffer (not shown) respectively, each of which stores decoded video data 210 and decoded audio data 220 in the internal frame buffers, and separately output in a phase different from the decoding timing, and output a timing pulse to timing controller 12 according to the output timing.

That is, decoders 13 and 14 of Embodiments 1 to 3 output the timing pulse to timing controller 12 when decoding has finished, however, decoders 13 and 14 of Embodiment 6 output the timing pulse to timing controller 12 at the time of outputting from the frame buffers inside decoders 13 and 14 in the phase different from the decoding timing.

Figure 19:
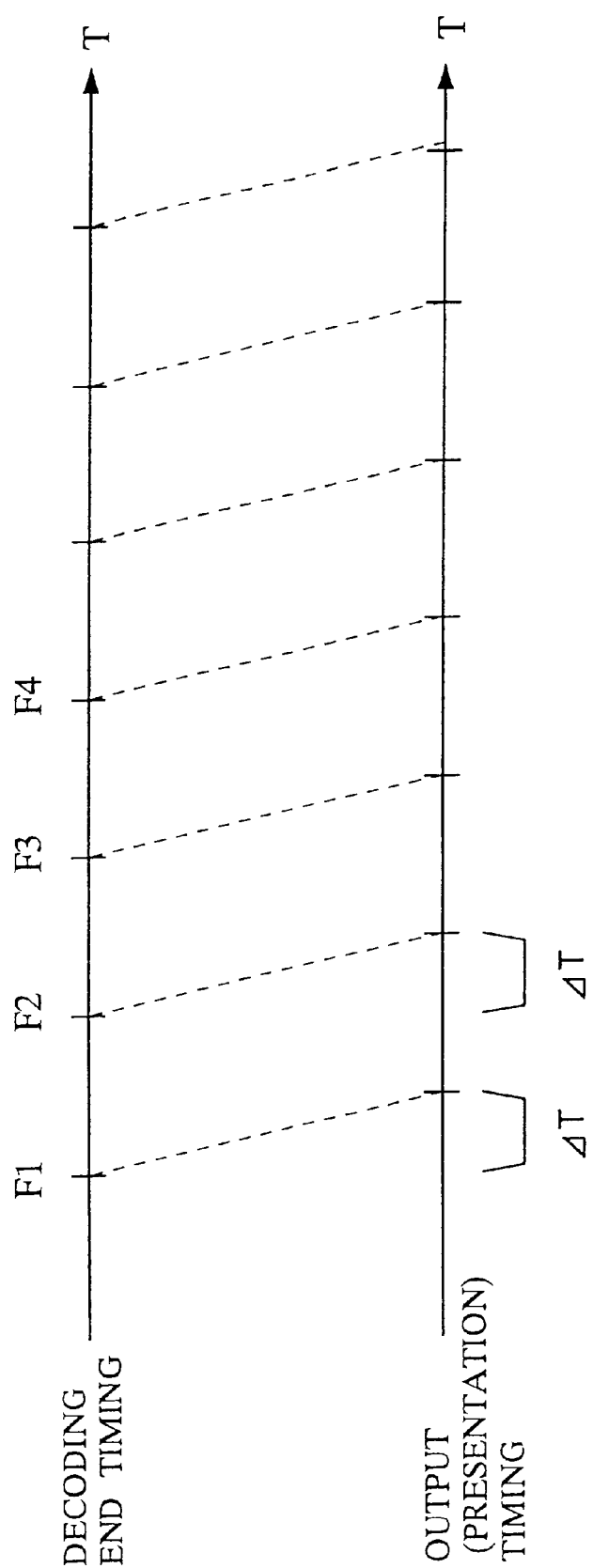
FIG. 19 shows the relationship between the decoding end timing and the output timing from a frame buffer of Embodiment 6.
Figure 20:
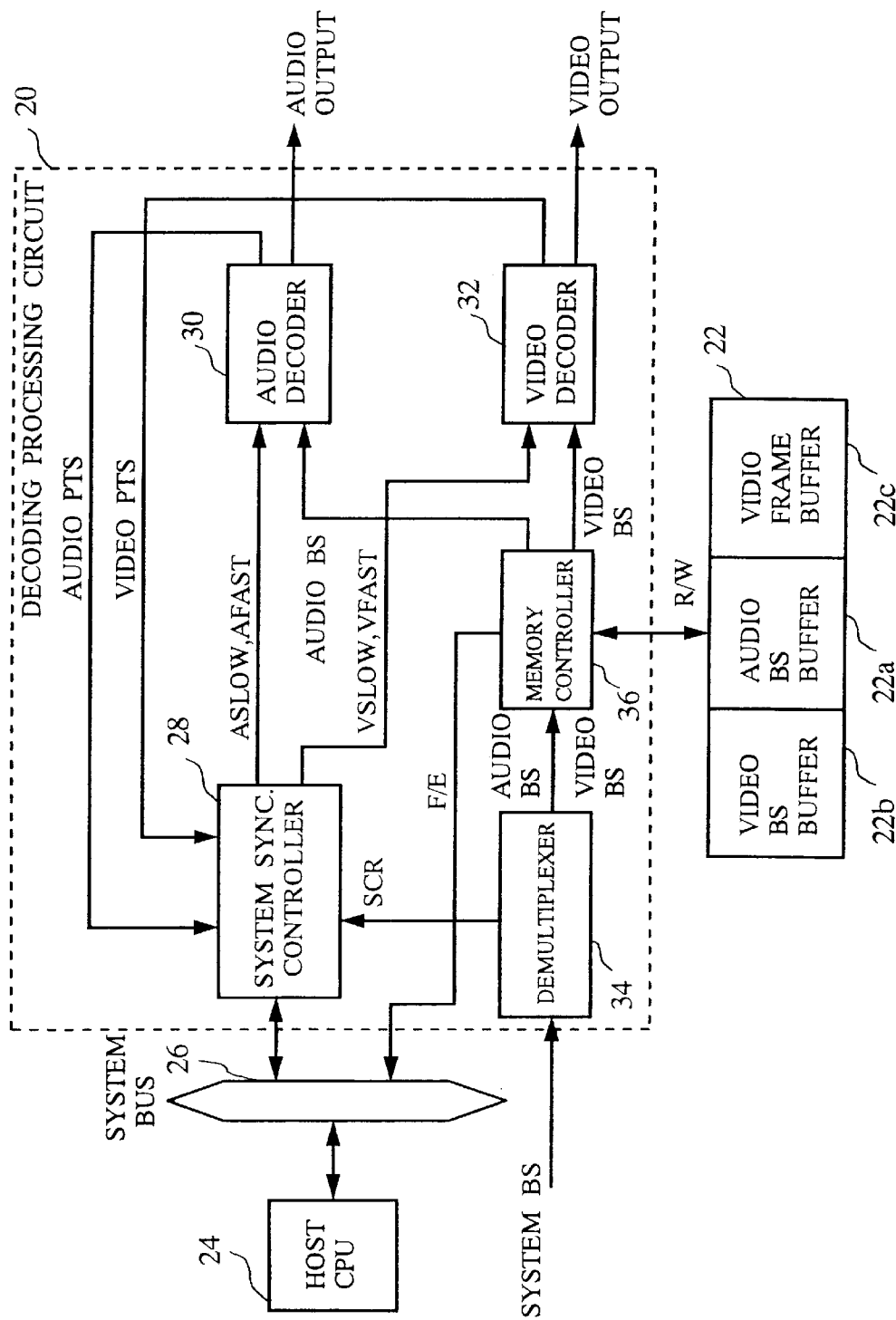
FIG. 20 shows a conventional data decoder.

FIG. 19 shows the relationship between the decoding timing of each video frame (F1, F2, F3, . . . ) and the presentation timing, which is the output timing from the frame buffers. The phase difference between the decoding timing and output timing is ΔT, and changes when the decoding timing is deviated due to error occurrence, and so on.

However, because the timing pulse is generated from the output timing from the frame buffers for decoders 13 and 14 of this embodiment, media can correctly synchronize without being affected by the changes in the phase difference even when the phase difference has changed due to error occurrence and so on.

As mentioned in Embodiment 1, the audio data or character data is decoded by the fixed time processing unlike the decoding of video data. Therefore, the output of the timing pulse from audio decoder 14 is omitted, and timing controller 12 does not latch the reproduced STC by the timing pulse from audio decoder 14, but latches the reproduced STC value from system time counter 11 at the demultiplexing timing of demultiplexer 10, so that the presentable STC value can be calculated by adding the audio decoding processing delay time which is the fixed value to the latched reproduced STC value. Thus, the processing can be simplified.

This invention enables the prompt and correct output of synchronous decoding of the coded data without regard to the characteristics or configuration of the encoder.

It is also possible to minimize the buffering time. The decoding which is not affected by the timing of presentable time and specified presentation time.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A data decoder, comprising:
   a. a demultiplexer for inputting a multiplexed coded data including a first coded data and a second coded data, and a synchronous information for synchronizing the first coded data and the second coded data, and outputting the first coded data, the second coded data, and the synchronous information separately;
   b. a first buffer memory for inputting and storing the first coded data demultiplexed by the demultiplexer;
   c. a second buffer memory for inputting and storing the second coded data demultiplexed by the demultiplexer;
   d. a first decoder for inputting and decoding the first coded data stored in the first buffer memory, and outputting a decoded data as a first decoded data;
   e. a second decoder for inputting and decoding the second coded data stored in the second buffer memory, and outputting the decoded data as a second decoded data; and
   f. a timing controller for inputting the synchronous information demultiplexed by the demultiplexer, for obtaining a buffering time to store the first coded data in the first buffer memory as a first buffering time and a buffering time to store the second coded data in the second buffer memory as a second buffering time, and for controlling an output time of the first coded data stored in the first buffer memory to the first decoder based on the first buffering time and controlling an output time of the second coded data stored in the second buffer memory into the second decoder based on the second buffering time, so that the first decoded data by the first decoder and the second decoded data by the second decoder are output synchronously as indicated by the synchronous information.

2. The data decoder of claim 1, wherein the demultiplexer demultiplexes a first specified presentation time at which the first decoded data is to be output and a second specified presentation time at which the second decoded data is to be output as the synchronous information, and wherein the timing controller calculates the first buffering time and the second buffering time in such a manner that a time difference between the first specified presentation time and the second specified presentation time agrees to a time difference between the output time of the first decoded data and the output time of the second decoded data.

3. The data decoder of claim 2, wherein the first decoder outputs a first timing pulse when the first decoded data in a designated unit has been decoded, and wherein the second decoder outputs a second timing pulse when the second decoded data in the designated unit has been decoded, and wherein the timing controller inputs the first and the second timing pulses, obtains a first and a second presentable times, respectively, and assigns the time difference between the first specified presentation time and the first presentable time as the first buffering time and the time difference between the second specified presentation time and the second presentable time as the second buffering time.

4. The data decoder of claim 3, wherein the timing controller inputs the timing pulse at a time of completing a first decoding of the first decoded data in the designated unit as the first timing pulse and inputs the timing pulse at the time of completing the first decoding of the second decoded data in the designated unit as the second timing pulse.

5. The data decoder of claim 3, wherein the demultiplexer demultiplexes and outputs a first identifier for identifying the first decoded data in each designated unit, and demultiplexes and outputs a second identifier for identifying the second decoded data in each designated unit, and wherein the first decoder outputs the first identifier and the first timing pulse and the second decoder outputs the second identifier and the second timing pulse, and wherein the timing controller inputs the first identifier output from the demultiplexer and the first identifier output from the first decoder, identifies the first decoded data, and calculates the first buffering time of the first decoded data to be decoded after an identified first decoded data, and inputs the second identifier output from the demultiplexer and the second identifier output from the second decoder, identifies the second decoded data, and calculates the second buffering time of the second decoded data to be decoded after an identified second decoded data.

6. The data decoder of claim 5, wherein the first and second identifiers are numeric values assigned to the first and second coded data for each designated unit at the time of coding.

7. The data decoder of claim 5, wherein the first and second identifiers are numeric values assigned to the first and second coded data by the demultiplexer for each designated unit.

8. The data decoder of claim 2, wherein the timing controller obtains a presentable time for the first decoded data using a remaining buffer amount management information contained in the first decoded data, and assigns the time difference between the first specified presentation time and a first presentable time as the first buffering time.

9. The data decoder of claim 8, wherein the timing controller adds a buffering time of the first decoded data indicated as the remaining buffer amount management information at the time when the demultiplexer demultiplexes the first decoded data and a delay time required by the first decoder for a decoding processing of the first decoded data, in order to obtain the presentable time.

10. The data decoder of claim 2, wherein the timing controller subtracts a same designated time from the first buffering time and the second buffering time to obtain a new first buffering time and a new second buffering time.

11. The data decoder of claim 10, wherein the same designated time is a time shorter of the first buffering time and the second buffering time.

12. The data decoder of claim 2, wherein the first decoder and the second decoder have frame buffers which store the first and second decoded data in designated units respectively, and then output at a designated timing, and outputs a first and a second timing pulses when the first and second decoded data are output from the frame buffers in the designated units respectively, and wherein the timing controller inputs the first and the second timing pulses, obtains a first and a second presentable times, and assigns the time difference between the first specified presentation time and the first presentable time as a first buffering time, and the time difference between the second specified presentation time and the second presentable time as a second buffering time.

13. A data decoding method, the method comprising the steps of:

a. inputting a multiplexed coded data including a first coded data and a second coded data and a synchronous information for synchronizing the first coded data and the second coded data and separately outputting the first coded data, the second coded data, and the synchronous information;

b. inputting the first coded data demultiplexed at a demultiplexing step and storing in a first buffer memory;

c. inputting the second coded data demultiplexed at the demultiplexing step and storing in a second buffer memory;

d. inputting and decoding the first coded data stored in the first buffer memory, and outputting a decoded data as a first decoded data;

e. inputting and decoding the second coded data stored in the second buffer memory, and outputting the decoded data as a second decoded data; and f. inputting the synchronous information demultiplexed by the demultiplexing step, obtaining a buffering time to store the first coded data in the first buffer memory as a first buffering time and a buffering time to store the second coded data in the second buffer memory as a second buffering time, and for controlling an output time of the first coded data stored in the first buffer memory to the first coded data decoding step based on the first buffering time and the second coded data stored in the second buffer memory into the second coded data decoding step based on the second buffering time, so that the first decoded data by the first decoder and the second decoded data by the second decoder are output synchronously as indicated by the synchronous information.

14. A data decoder, comprising:
a. a demultiplexer for inputting a multiplexed coded data including a first coded data and a second coded data, and a synchronous information for synchronizing the first coded data and the second coded data, and outputting the first coded data, the second coded data, and the synchronous information separately;
b. a first buffer memory for inputting and storing the first coded data demultiplexed by the demultiplexer;
c. a second buffer memory for inputting and storing the second coded data demultiplexed by the demultiplexer;
d. a first decoder for inputting and decoding the first coded data stored in the first buffer memory, and outputting a decoded data as a first decoded data;
e. a second decoder for inputting and decoding the second coded data stored in the second buffer memory, and outputting the decoded data as a second decoded data; and
f. a timing controller for inputting the synchronous information demultiplexed by the demultiplexer, for calculating a buffering time to store the first coded data in the first buffer memory as a first buffering time and a buffering time to store the second coded data in the second buffer memory as a second buffering time, and for controlling an output time of the first coded data stored in the first buffer memory to the first decoder based on the first buffering time and controlling an output time of the second coded data stored in the second buffer memory into the second decoder based on the second buffering time, so that the first decoded data by the first decoder and the second decoded data by the second decoder are output synchronously as indicated by the synchronous information.

15. A data decoding method, the method comprising the steps of:
a. inputting a multiplexed coded data including a first coded data and a second coded data and a synchronous information for synchronizing the first coded data and the second coded data and separately outputting the first coded data, the second coded data, and the synchronous information;
b. inputting the first coded data demultiplexed at a demultiplexing step and storing in a first buffer memory;
c. inputting the second coded data demultiplexed at the demultiplexing step and storing in a second buffer memory;
d. inputting and decoding the first coded data stored in the first buffer memory, and outputting a decoded data as a first decoded data;
e. inputting and decoding the second coded data stored in the second buffer memory, and outputting the decoded data as a second decoded data; and
f. inputting the synchronous information demultiplexed by the demultiplexing step, calculating a buffering time to store the first coded data in the first buffer memory as a first buffering time and a buffering time to store the second coded data in the second buffer memory as a second buffering time, and for controlling an output time of the first coded data stored in the first buffer memory to the first coded data decoding step based on the first buffering time and the second coded data stored in the second buffer memory into the second coded data decoding step based on the second buffering time, so that the first decoded data by the first decoder and the second decoded data by the second decoder are output synchronously as indicated by the synchronous information.

* * * * *